United States Patent [19]

Ashman

[11] 4,095,081

[45] June 13, 1978

[54] ELECTRIC ARC METAL SPRAYING DEVICES

[75] Inventor: Stewart John Ashman, Dudley, England

[73] Assignee: Metallisation Limited, Dudley, England

[21] Appl. No.: 674,134

[22] Filed: Apr. 6, 1976

[30] Foreign Application Priority Data

Apr. 9, 1975 United Kingdom ............... 14509/75

[51] Int. Cl.² ........................... B23K 9/04; B05B 1/24

[52] U.S. Cl. .................................. 219/76.16; 219/74; 239/81; 239/DIG. 12

[58] Field of Search ............................ 219/74, 75, 76; 239/DIG. 19, 80, 81, 433

[56] References Cited

U.S. PATENT DOCUMENTS

| | | | |
|---|---|---|---|
| 2,903,559 | 9/1959 | Wempe | 219/74 |
| 3,197,605 | 7/1965 | Sunnen | 219/76 |
| 3,358,114 | 12/1967 | Inoue | 219/76 |
| 3,599,430 | 8/1971 | Kromrey | 239/DIG. 19 |
| 3,639,720 | 1/1972 | Malivoir | 219/76 |
| 3,936,655 | 2/1976 | Arnoldy | 219/76 |

FOREIGN PATENT DOCUMENTS

| | | | |
|---|---|---|---|
| 1,351,691 | 5/1974 | United Kingdom | 219/76 |

*Primary Examiner*—Elliot A. Goldberg
*Attorney, Agent, or Firm*—Friedman, Goodman & Teitelbaum

[57] ABSTRACT

A metal spraying device of the kind in which two wires are fed along convergent guide ducts, and an electric potential is established between the wires, so that an electric arc is produced between the terminal ends of the wires. A jet of air is blown across the arc, removing metal from the ends of the wires in the form of minute droplets, the jet of air being directed against a workpiece to be sprayed with a metallic coating. The metal spraying device comprises a head made of insulating material (e.g. ceramics material), the head being provided with passages forming the guide ducts for the wires and for the jet of air. In this manner, the wires may be guided more accurately to the arcing zone, and turbulence in the jet of air may be minimized, producing an overall improvement in the quality of the spray which may be achieved.

15 Claims, 6 Drawing Figures

ELECTRIC ARC METAL SPRAYING DEVICES

BACKGROUND OF THE INVENTION

1. Field of the Invention

This invention is concerned with improvements in or relating to metal spraying devices.

2. Description of the Prior Art

Metal spraying devices are often of the kind comprising feed means for simultaneously feeding two metallic wires or rods (hereinafter for convenience merely referred to as "wires") through a pair of guide tubes which converge forwardly of the direction of wire feed, means for connecting an electrical potential across said wires to cause an arc to be established between the wires where they emerge from said guide tubes so as to melt the wires, and means for feeding a stream of compressed air or other non-combustible gas (hereinafter referred to for convenience as an "air jet") relative to the wires and the arc therebetween so as to cause molten metal droplets to be carried from the arcing zone on the air jet from the device. Such a metal spraying device is hereinafter referred to as being of the kind specified, and an example of such a device is described in the Specification of our U.K. Pat. No. 1,346,054.

One of the difficulties associated with metal spraying devices of the kind specified is that of guiding the two wires forwardly and in accurate relationship one to the other, so that the position and length of the arc between the wires where they emerge from the guide tubes remains essentially constant. It will be understood that the length of the arc is normally quite small, and that a very small discrepancy between the relative positions of the leading ends of the two wires could quite rapidly cause the arc to lengthen to an extent such that it would be extinguished by the air jet, or alternatively to cause the two wires to come into contact and thus extinguish the arc.

The direction of the air jet must also be precisely related to the arcing zone in order to ensure that the molten metal will be propelled forwardly from the device in a stream of suitably divided droplets. It will be appreciated that displacement of the arcing zone will result in incorrect positioning of the air jet, relative to the arcing zone, leading to unsatisfactory formation of the spray stream.

In known metal spraying devices wires are fed through two tubular electrically conductive guide tubes which extend to positions on either side of the air jet nozzle, which is secured to the device separately from the guide tubes. With this arrangement the capability of the guide tubes to provide support for the wires close to the arcing zone is limited, due to the physical size necessary for the guide tubes and nozzle, together with the difficulties associated with the electrical insulation of the components one from another. Thus, any kinks or similar irregularities in the wires as they emerge from the guide tubes can cause a significant displacement of the arcing zone.

Furthermore, under repeated operation, considerable wear occurs in the guide tubes due to the rubbing action of the wires against the tubes, and due to the eroding effect of minute electrical arcs which occur from time to time between the wire and the walls of the guide tubes. Such minute electrical arcs occur due to failure of the wires to be maintained in good electrical contact with their associated guide tubes, and may possibly be caused by oxide films on the wires, and/or the presence of dust or other foreign matter carried into the guide tubes by the wires. The excessive clearance between the wires and the guide tubes resulting from wear further reduces the support and guiding capability, which rapidly promotes intermittent arcing and the inclusion of unmelted wire ends in the coating being sprayed.

Furthermore, the need to maintain the air jet nozzle electrically insulated from the guide tubes often necessitates the distance between the nozzle and the arcing zone being substantial: thus, either the adverse effects of turbulence developed in the air jet in its flow from the nozzle to the arcing zone must be tolerated, or special provision to minimise such effect must be made.

It is one of the various objects of this invention to provide a metal spraying device in which high quality of metal spray is achieved consistently, and/or relatively inexpensively.

BRIEF SUMMARY OF THE INVENTION

This invention provides a metal spraying device comprising a body, a head assembly secured to the body and comprising a head of electrically insulating material, two guide passages extending through the head, mechanism for feeding metallising wires through the passages, said guide passages converging forwardly of the direction of wire feed, and an air passage extending through the head between said guide passages, the device also comprising contact means for connecting said wires to a source of electric current at a position prior to entry of the wires into the guide passages, to establish an arc between the wires as they emerge from their respective guide passages, and means for feeding air under pressure through the air passage to cause molten metal droplets to be carried from the arcing zone on a stream of air from the device.

Since the head is of electrically insulating material, the wires may be guided by the guide passages to a position very close to the arcing zone, providing high positional stability of the arcing zone, and a consistent high quality of arc. In addition, the point of emergence of the air stream from the head may similarly be positioned close to the arcing zone, minimising detrimental effects of turbulence forming in the air stream prior to its impingement on the arcing zone.

Preferably, the contact means comprises two contact tubes, one for each wire, each being provided with pressure means whereby a radial load may be applied to wire within the tube. This produces a positive surface-to-surface engagement between the tube and wire, and ensures good electrical contact therebetween, thus minimising the detrimental effects of arcing between the tube and wire. The radial load may either be provided by a pressure member spring-urged radially through a slot in the tube to press the wire against the tube, or may be provided by a compressive loading applied externally of the tube radially thereof, such as by a clamp device which compresses the tube radially into good electrical contact with the advancing wire.

Preferably, the air passage extends through the head, preferably along the longitudinal axis thereof, conveniently emerging from the head between the positions of emergence of the guide passages.

The electrically insulating material from which the head is formed may be of a plastics material, e.g. a thermosetting resin, the body being shaped by a moulding operation together with any machining operations which may be subsequently necessary in the provision of the guide and air passages, and to enable the head to be secured as part of the metal spraying device. Preferably the material is resistance to the effects of ultra-violet radiation emitted by the arc, and is preferably of ceramics material or other non-metallic refractory material. Materials which may advantageously be used include silicon nitride and boron nitride, and members of the porcelain family. Preferably, a porcelain having a trade name known as "Pyrophylite" is used, which may be formed from a block by a machining operation.

The head assembly conveniently comprises an outlet nozzle providing a forwardly-convergent frusto-conical surface which extends to an outlet, said outlet nozzle being secured co-axially with respect to the head in a manner such that the air stream emerging from the air passage passes through the outlet. A second air stream fed through the outlet nozzle from a source of compressed air flows through the outlet in the form of an annulus extending around the arcing zone, surrounding the first air stream in the vicinity of its impingement upon the arc. In this manner, dispersal of the molten metal droplets in the arcing is minimised by the constraint of the second air stream, which results in the production of a spray comprising finer, more closely packed droplets and hence a superior surface finish in the sprayed article.

Preferably the position of the outlet nozzle is axially adjustable relative to the body, whereby it may be secured in an optimum position determined by the type of metal being sprayed, the current flowing through the arc, and the velocity of the first air stream.

Preferably, the metal spraying device comprises further means for selectively shaping the air stream in accordance with the requirements of any particular metal spraying operation being carried out.

BRIEF DESCRIPTION OF THE DRAWINGS

In the accompanying drawings

Figure 1:
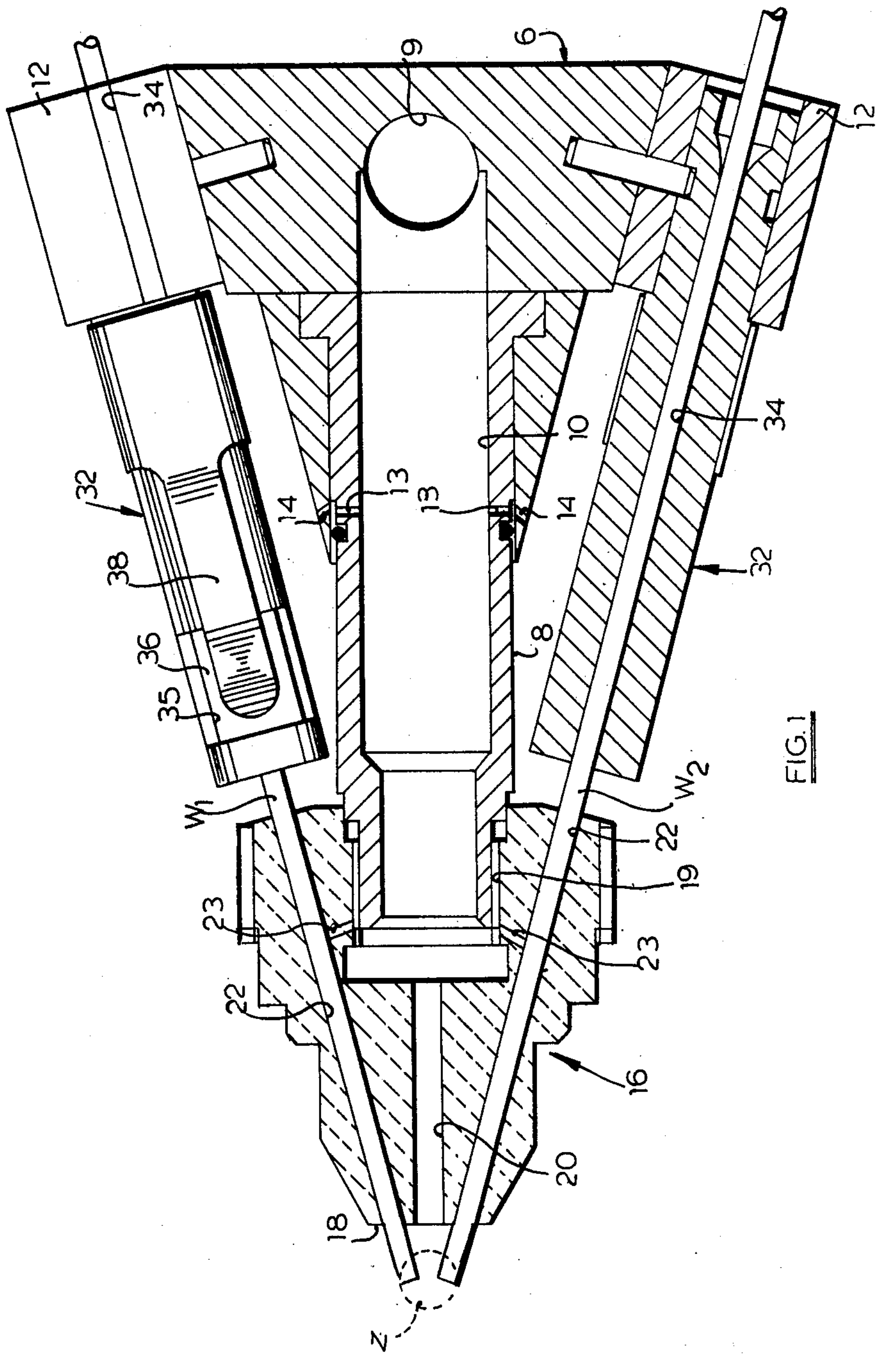
FIG. 1 is a sectional view illustrating the basic form of part of a metal spraying device which is a preferred embodiment of this invention.
Figure 2:
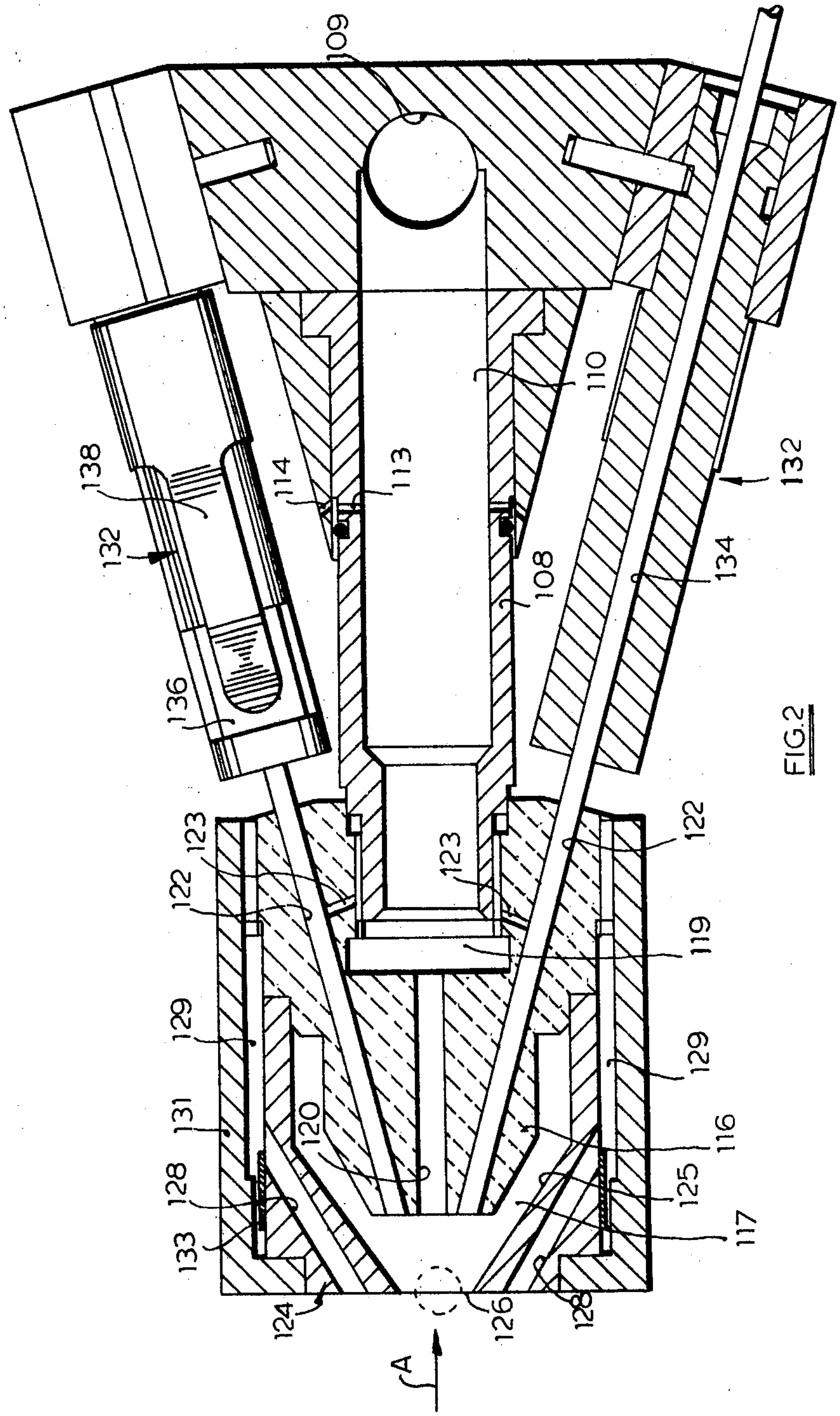
FIG. 2 is a view similar to that shown in FIG. 1, showing a modified form of the preferred embodiment provided with an outlet nozzle.

The metal spraying device which is the preferred embodiment of this invention (FIG. 1) comprises a body 6 provided with a generally cylindrical stem 8, and a head 16 of a head assembly mounted on the stem, the head being provided with an inlet 19 into which an end portion of the stem is secured. The head 16 is formed in one piece from an insulating material, preferably a ceramics material, by a machining operation: in the preferred embodiment, the head is of a ceramics material sold under the trade name "Pyrophylite".

Extending axially through the head from the inlet 19 is a first air passage 20, through which compressed air may be fed from an axial passage 10 of the stem, and extending through the head, lying in an axial plane thereof, are two guide passages 22,22, said guide passages converging towards and exiting through a forwardly-presented end face 18 of the head.

Figure 5:
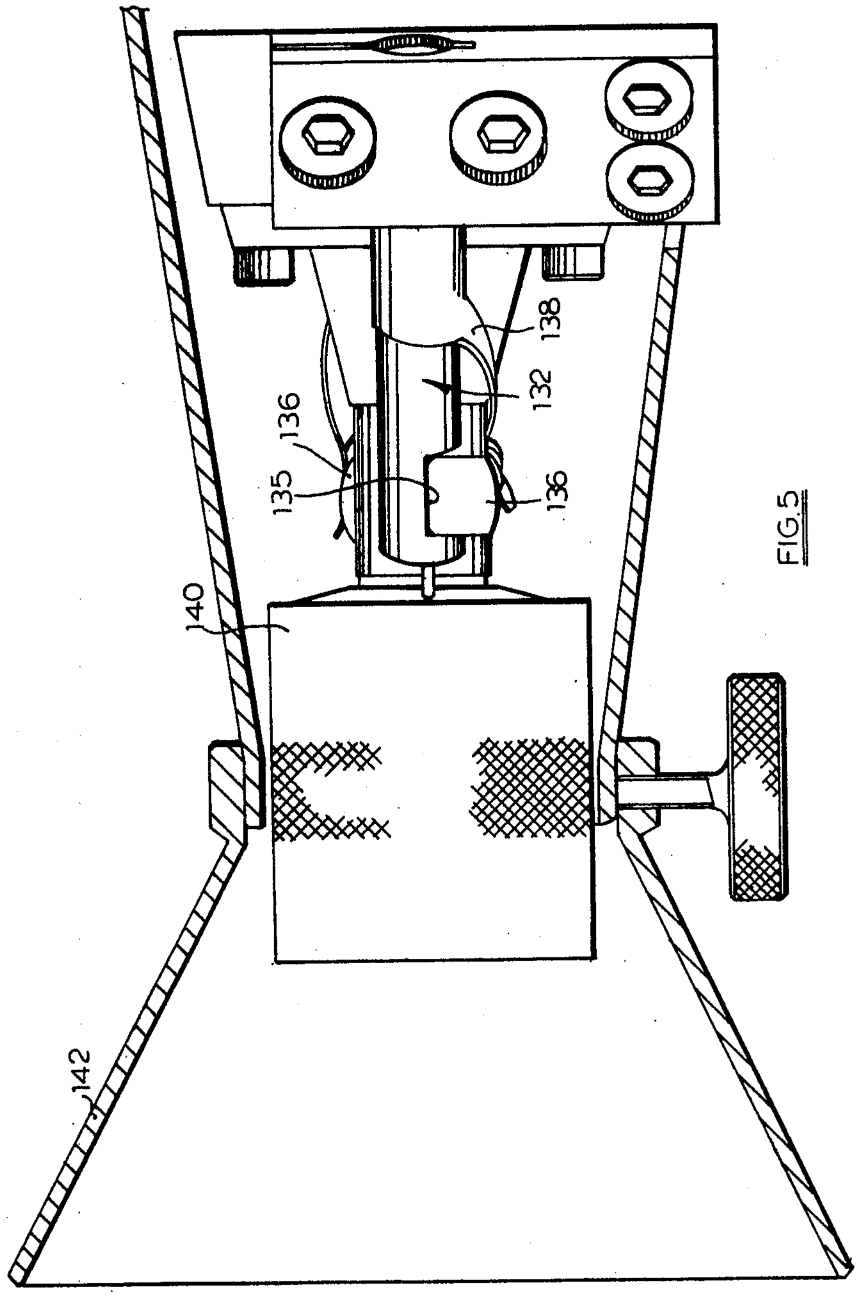
FIG. 5 is a side elevation, partly in section, of the modified form, showing a hood and shroud thereof.

The body 6 also comprises two forwardly-convergent contact tubes 32,32 which are mounted in conductive terminal blocks 12 and which extend alongside the stem 8, each contact tube being provided with a through bore 34 parallel to one of the guide passages 22. A short semi-cylindrical slot 35 is provided in each guide tube 32, and mounted therein is a pressure pad 36, each pressure pad being urged inwardly in a radial direction by a spring arm 38 (FIG. 5).

In the use of the device, metallising wires $W_1$ and $W_2$ are fed by feeding mechanism of the device through the bores 34 and into the guide passages 22. The terminal blocks are connected to a current source, establishing an electric potential between the two wires, so that an electrical arc is established between the wires in an arcing zone Z as they emerge from their respective guide passages 22 a short distance in front of the face 18 of the head 16.

Air from a source of compressed air (not shown) is fed into an inlet bore 9 of the body 6, such air flowing along said passage 10 of the stem 8 into the inlet 19, and through the air passage 20, a stream of air flowing from the head between the two wires. Thus, air flows from the passage 20 through the arcing zone, causing molten metal droplets produced by arcing to be carried from the device, to be deposited upon a surface being sprayed.

By the use of the preferred embodiment of this invention, extremely accurate positioning of the arcing zone may be obtained, resulting in a substantially uniform production of molten metal droplets, and high quality spraying. In addition, if it is required to change the metal being sprayed, for a metal which requires somewhat different arcing conditions, it is merely necessary to remove the head 16, and position on the stem 8 a head having guide passages at a somewhat different geometrical disposition.

Since electrical contact with the wires is established prior to entry of the wires into the head, and since the head is of insulating material, wear within the guide passages 22 may be maintained comparatively small, ensuring a higher reliability of the device over extended periods of use.

Short passages 13 and 14 extend radially through the stem 8, and through a frusto-conical collar mounted on the stem, whereby jets of air may be directed against the contact tubes 32, and specifically the pressure pads 36 thereof, to maintain said contact tubes cool. In addition, cross-passages 23 extend from the inlet 19 to both guide passages 22, such air passing between the guide passages and wire therein, serving to maintain said wire relatively cool, and thereby prevent them from becoming softened by heat.

In the modified form of the preferred embodiment, the metal spraying device is basically similar to that illustrated in FIG. 1, and like parts have been identified by the same numeral with the prefix "1". However, in the second embodiment, the head assembly also comprises an outlet nozzle 124 of ceramics material secured in position on the head 116 by a retaining ring 131, said outlet nozzle comprising a concave frusto-conical surface 125 extending towards an outlet 126 thereof. The outlet nozzle is positioned co-axially with respect to the head, and the frusto-conical surface 125, together with a convex frusto-conical outer surface of the head 116 defines an annular space 117.

Figure 3:
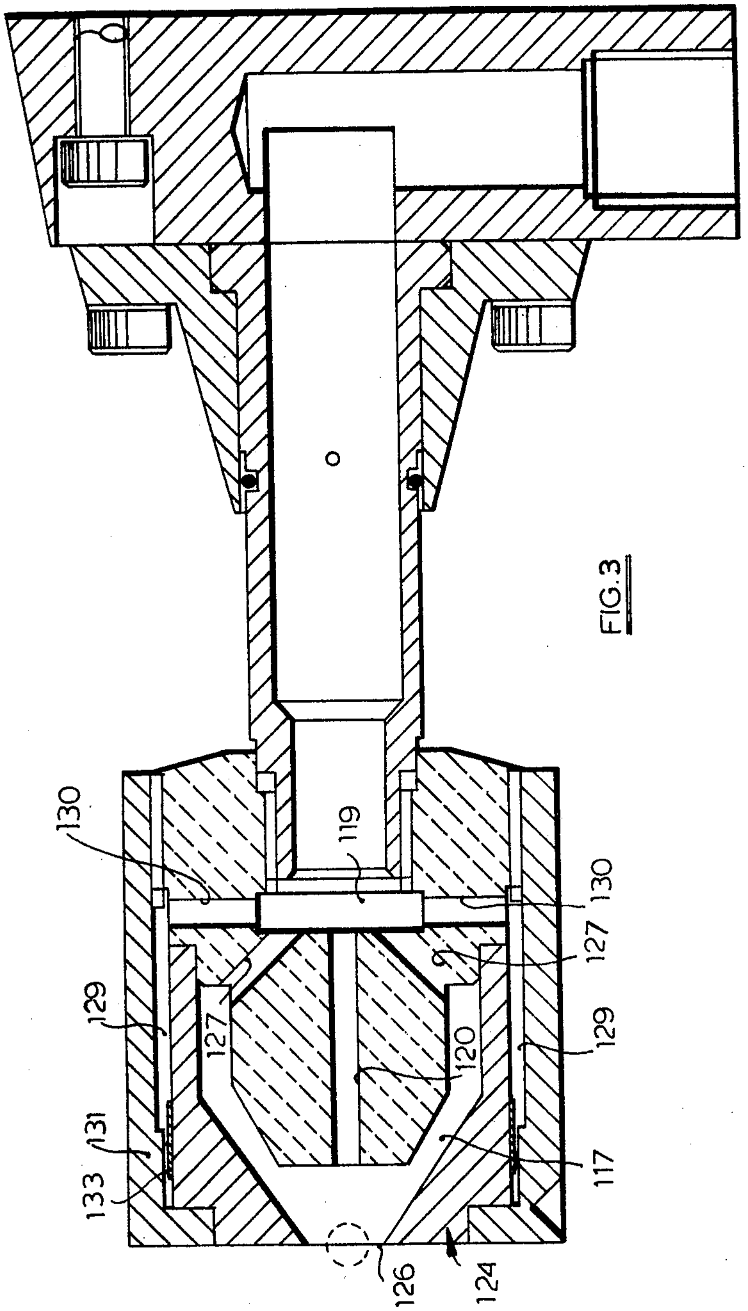
FIG. 3 is a sectional view of the modified form taken at right-angles to that shown in FIG. 2.
Figure 4:
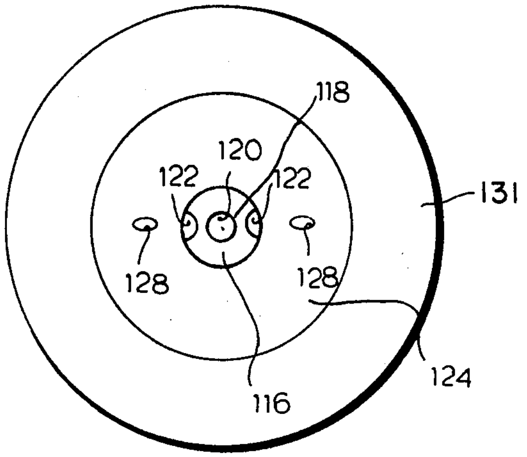
FIG. 4 is a view, taken in the direction of the arrow A, of a forwardly-presented face of the modified form.

Extending from the inlet 119 to the annular space 117 are two secondary air passages 127,127, (see FIG. 3).

Thus, air flows from the axial passage 110 not only through the primary air passage 120, but also through the annular space 117, and flows through the outlet 126 thereof in the form of an annulus extending around the arcing zone and surrounding the air stream from the primary air passage 120 as it impinges upon the arc. In practice, the arc is established in a zone lying axially of the head immediately beyond the outlet 126, and in this manner, dispersal of molten metal in the arcing zone due to impingement thereon by the primary air stream is minimised. In addition, if desired, the air passages 127 may be off-set laterally, so as to produce a swirling air motion within the annular space 117.

In addition, extending through the outlet nozzle 124 from an annular space 129 between the outlet nozzle 124 and the retaining ring 131, are two convergent passages 128,128, said passages lying in the axial plane in which the primary air passage 120 and the two guide passages 122 lie. Two radial passages 130 extend from the inlet 119 to said annular space 129 by which air may be fed through said passages 128. The effect of flow of air from these passages is to cause the spraying stream (produced by air flowing through the primary and secondary air passages 120 and 127 respectively) to be flattened somewhat in said axial plane, producing a generally fan-shape spraying stream.

However, means is provided to close the passages 128, said means being provided by a spring band 133 encircling the outlet nozzle 124. Said spring band may be positionally adjusted, in an axial direction, to partially or completely close said passages 128, to reduce or eliminate the shaping of the spraying stream otherwise produced by the air stream issuing therefrom. Alternatively, said band may be additionally rotated so as to close one of said passages 128, allowing air to flow through the other, to produce a spraying stream which is somewhat planar-convex in cross-section.

In addition, the position of the outlet nozzle in a direction axially of the head 116 may be adjusted, to vary the effect of said secondary air stream in accordance with the density of spraying required as may be effected by the particular metal which is being sprayed.

In FIG. 5, said modified form is illustrated in perspective view, showing the device covered with a protective hood 140, over which a protective shroud 142 is secured. Such hood and shroud may similarly be used with the basic form of the preferred embodiment otherwise illustrated in FIG. 1.

Figure 6:
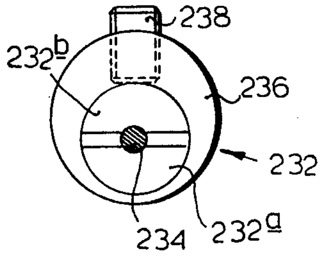
FIG. 6 is a schematic sectional view showing alternative contact means of the preferred embodiment.

FIG. 6 illustrates an alternative form of electrical contact means, involving the use of two contact tubes 232 of an electrically conducting material such as copper or aluminium. Each of the contact tubes comprises an axial passage 234, and is split diametrically into segments (denoted by the suffixes *a* and *b*). Extending around each contact tube 232 is a clamping band 236 comprising a grub screw 238 by which radial pressure may be exerted on one of the segments of the contact tube to decrease the diameter of the passage 234. Thus, by adjustment of the grub screw 238, a radial load may be applied to wire fed through the passage 234 to an extent such as to ensure good electrical contact between the wire and the opposite segment of the contact tube.

By the use of this invention, since the head is of insulating material, it is unnecessary to insulate the guide passages one from another, or from the primary air passage. This allows the guide passages and primary air passage to emerge from the head relatively close together, and a short distance from the arcing zone. This ensures that instability of the arcing zone, due to flexing of the wires, is unlikely to occur to a serious extent, and ensures that a high positional stability between the arcing zone and primary air jet is established. This minimises the occurrence of turbulence in the primary air flow between the leading face of the head and the arcing zone, and results in the production of a spraying stream having a greater number of smaller droplets distributed therein in a more uniform density, which allows a denser, finer coating to be sprayed, and consequently a better surface finish to be obtained.

In addition, optionally the secondary air stream may be utilised to produce an elongation of the plasma zone, allowing materials having a high melting point to be sprayed. In addition, optionally, the shaping air stream may be utilised to vary the shape of the spray stream.

I claim:

1. A metal spraying device comprising:

a body;

a head assembly;

means securing said body to said head assembly;

said head assembly including a head fabricated from electrically insulating material;

aperture means provided longitudinally through said head for permitting metallising wire in electrical contact to be fed therethrough in engagement with sidewalls of said aperture means, said sidewalls consisting of said insulating material of said head;

said aperture means consisting of two guide passages, said two guide passages converging continuously towards each other in a direction of wire feed towards a leading face of said head and extending from a rear surface of said head to said leading face, and said two guide passages emerging at said leading face to provide an arcing zone for two metallising wires as the two wires emerge from said two guide passages respectively;

mechanism means for feeding said two wires through said two guide passages respectively;

an air passage longitudinally extending through said head between said two guide passages and emerging at said leading face for conveying air to said leading face;

contact means on said body for connecting said wires to a source of electric current at a position prior to entry of the wires into the guide passages to establish an arc between the wires as they emerge from their respective guide passages; and means connected to said body for feeding air under pressure through said air passage to cause molten metal droplets to be carried from the arcing zone on an air stream emerging from the device.

2. A metal spraying device according to claim 1 comprising outlet nozzle means secured to said head to provide a second air stream emerging from the device in a form of an annulus extending around the arcing zone.

3. A metal spraying device according to claim 1 comprising outlet nozzle means secured to said head to provide a second air stream emerging from the device in a frusto-conical form converging towards the arcing zone.

4. A metal spraying device according to claim 1 wherein the air passage emerges from the head between positions of emergence of the guide passages.

5. A metal spraying device according to claim 4 wherein the guide passages and air passage lie in a longitudinal axial plane of the head.

6. A metal spraying device according to claim 3 wherein the outlet nozzle means is positionally adjustable relative to the head to enable any position of the second air stream to be varied relative to the arcing zone, in a direction extending axially of the first mentioned air stream.

7. A metal spraying device according to claim 1 comprising shaping means for selectively shaping the air stream.

8. A metal spraying device according to claim 1 wherein the head is of a thermosetting plastics material.

9. A metal spraying device according to claim 1 wherein the head is of a ceramics material.

10. A metal spraying device according to claim 9 wherein the head is of porcelain.

11. A metal spraying device according to claim 7 wherein said shaping means includes at least one further air passage from which a further air stream is directed against the first mentioned air stream.

12. A metal spraying device according to claim 7 wherein said shaping means includes two further air passages from which two further air passages respectively are directed against the first mentioned air stream, said two further air passages lying in a plane containing longitudinal axes of the guide passages and the first mentioned air passage, said device including closure means to selectively close one of said two further air passages in a first position thereof and both of said two further air passages in a second position thereof.

13. A metal spraying device comprising a body, a head assembly secured to the body and comprising a head of electrically insulating material, two guide passages extending through the head, mechanism means mounted on the body for feeding metallising wires through the passages, said guide passages converging forwardly of a direction of wire feed, and an air passage extending through the head between said guide passages, the device also comprising contact means on the body for connecting said wires to a source of electric current at a position prior to entry of the wires into the guide passages to establish an arc between the wires as they emerge from their respective guide passages, said contact means including two contact tubes, each contact tube being provided with pressure means for applying a radial load to wire within the contact tube, and means connected to the body for feeding air under pressure through the air passage to cause molten metal droplets to be carried from arcing zone on a stream of air from the device.

14. A metal spraying device according to claim 13 wherein each contact tube is provided with a slot, said pressure means including a pressure pad located within the slot and spring means to urge the pressure pad into the slot into engagement with wire in the contact tube.

15. A head for use in a metal spraying device, said head comprising:

a body member fabricated from electrically insulating material;

recess means provided in said body member for securely receiving a body portion of the metal spraying device;

said body member having a leading face;

air passage means longitudinally extending axially through said body member and emerging at said leading face for conveying air to said leading face, said leading face being at a right angle to said air passage means;

inlet means provided in said body member for connecting said air passage means to a source of air under pressure;

aperture means provided longitudinally through said body member for permitting metallising wire in electrical contact to be fed therethrough in engagement with sidewalls of said aperture means, said sidewalls consisting of said insulating material of said body member;

said aperture means consisting of two guide passages, said two guide passages converging continuously towards each other in a direction towards said leading face and extending from a rear surface of said body member to said leading face, and said two guide passages emerging at said leading face on opposite sides of said air passage means to provide an arcing zone for two metallising wires as the two wires emerge from said two guide passages respectively.

* * * * *